United States Patent [19]

Kopf-Sill et al.

[11] Patent Number: 5,053,060
[45] Date of Patent: Oct. 1, 1991

[54] DEVICE AND METHOD FOR DEGASSING, GASSING AND DEBUBBLING LIQUIDS

[75] Inventors: Anne Kopf-Sill, Portola Valley; Henry L. Schwartz, Los Gatos, both of Calif.

[73] Assignee: Molecular Devices Corporation, Menlo Park, Calif.

[21] Appl. No.: 546,094

[22] Filed: Jun. 29, 1990

[51] Int. Cl.$^5$ .............................................. B01D 19/00
[52] U.S. Cl. .......................................... 55/16; 55/36; 55/84; 55/158; 55/159; 55/208; 55/222
[58] Field of Search ....................... 55/36, 84, 16, 158, 55/159, 208, 222

[56] References Cited

U.S. PATENT DOCUMENTS 4,302,223 11/1981 Booth et al. ............................ 55/158
4,886,528 12/1989 Aaltonen et al. ...................... 55/158

FOREIGN PATENT DOCUMENTS 258605 10/1988 Japan ..................................... 55/159

Primary Examiner—Bernard Nozick
Attorney, Agent, or Firm—Allegretti & Witcoff, Ltd.

[57] ABSTRACT

This invention is a debubbler, degasser or gasser device used to remove gas bubbles and/or dissolved gasses from a liquid stream or to add gasses to a liquid stream. The device consists of a first block, a hydrophobic membrane, and a second block. The first block has a channel for carrying liquids which is grooved into its lower surface. The end of the channel is connected to an inlet and outlet. The second block has venting holes. When the hydrophobic membrane is pressed between the first and second block liquid can flow through the channel and bubbles or dissolved gasses in the liquid stream pass through the hydrophobic membrane. Alternatively, or in combination with degassing or debubbling, the device may be employed to introduce into the liquid stream gasses provided on the opposing side of the hydrophobic membrane.

3 Claims, 2 Drawing Sheets

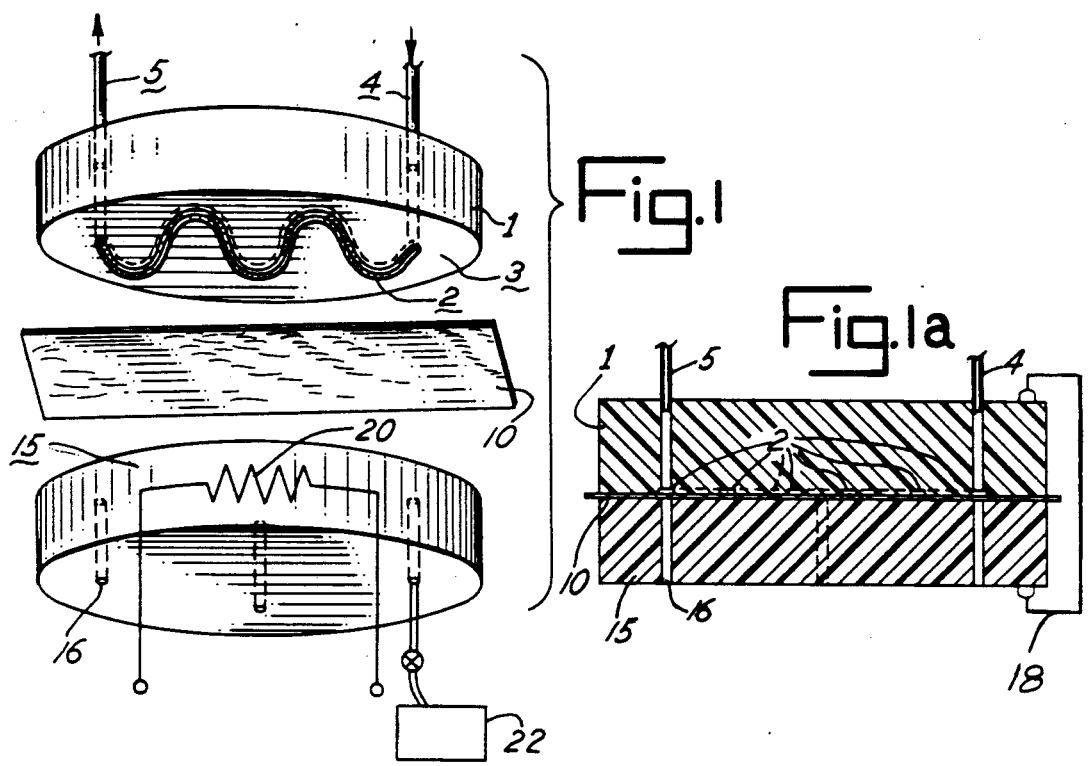
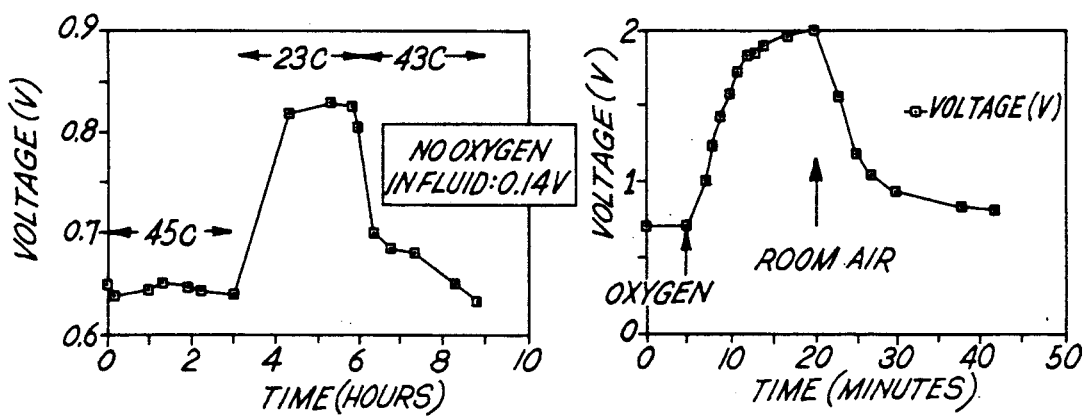

DEVICE AND METHOD FOR DEGASSING, GASSING AND DEBUBBLING LIQUIDS

A. FIELD OF THE INVENTION

This invention is in the field of devices, methods and apparatuses for removing gas bubbles and/or dissolved gasses from liquids or adding dissolved gasses to liquids. More particularly, this invention relates to a device for removing bubbles and dissolved gasses from liquid streams going to an analyzer or replacing dissolved gasses in liquid streams going to an analyzer.

B. DESCRIPTION OF THE PRIOR ART

U.S. Pat. No. 4,729,773 describes the use of tubes which are porous to the passage of gasses but not liquids to remove gasses from liquids. Additionally, the '773 patent fails to teach or suggest adding dissolved gasses to liquids.

U.S. Pat. No. 4,516,984 describes a container permeable to oxygen while retaining fluid. The oxygen, once passed through the membrane, is reacted with a deoxygenating agent. The '984 patent only teaches removing oxygen, and not other gasses, from a fluid stream. Further, the '984 patent fails to teach or suggest adding gasses to liquid streams or debubbling liquids.

U.S. Pat. No. 2,809,107 describes a method for removing dissolved hydrogen from molten metal by diffusing the hydrogen through a membrane permeable to the hydrogen but not permeable to molten metal.

U.S. Pat. No. 4,437,082 describes an apparatus including a liquid recirculating device upgrading transformer dielectric fluid by degassing, demoisturizing, and continually filtering the fluid. However, the '082 patent fails to teach or suggest adding gasses to liquid streams or debubbling liquids.

U.S. Pat. No. 3,803,061 describes microporous phenolic polyether membranes used in oxygenation, electricity generators, degassation, and ultrafiltration. The '061 patent also teaches a process for producing the membranes.

U.S. Pat. No. 4,523,934 describes a filter-degasser equipped with means for non-rotatably connecting it to and disconnecting it from a receptacle for a liquid being filtered and degassed. Further, the '934 patent teaches of a filter-degasser of the vacuum application portion in combination with the filtering portion. The vacuum application portion is downstream from the filtering portion. Additionally, the '934 patent fails to teach or suggest adding gasses to liquid stream.

U.S. Pat. No. 4,756,821 describes a method of liquid phase hydrotreatment of heavy hydrocarbons in the presence of a dispersed catalyst. The '821 patent fails to teach or suggest adding dissolved gasses to a liquid.

U.S. Pat. No. 4,770,769 describes controlling ultrafiltration in connection with a hemodialysis operation using a balancing device and dosing device to form a closed control loop. The closed control loop controls the entry of fresh dialysis solution into one chamber of the balancing device while also controlling the withdrawal of the used up dialysis solution from the other chamber of the balancing device. The closed control loop also controls a pump for the metered withdrawal of used-up dialysis solution. The dosing device ensures the proper mixture of water and dialysis concentrate.

U.S. Pat. No. 4,717,377 describes a blood circulating circuit for a membrane-type artificial lung wherein the volume of blood circulating within the circuit is regr- lated by a pair of opposing planar restricting members. This device permits oxygenation of blood.

SUMMARY OF THE INVENTION

The invention encompasses a device for debubbling and/or degassing a fluid stream or gassing the fluid stream which comprises:
a. a first block;
b. a membrane, and
c. a second block.

The first block is placed on top of the membrane which is placed on top of the second block. The first block has a grooved channel for liquid flow. The ends of the channel are connected to an inlet and outlet which serve as means for placing and removing liquid from the channel. The second block has a plurality of venting holes which provide means for escape of bubbles and/or dissolved gasses from the channel via the middle membrane. The invention also encompasses methods for debubbling, degassing, and adding gas to a liquid stream which utilize the above-described device.

BRIEF DESCRIPTION OF THE DRAWINGS

FIG. 1 is a perspective view of debubbler;

FIG. 1a is a cross section view of debubbler;

FIG. 2 is a graph showing the removal of oxygen with elevated temperatures;

FIG. 3 is a graph showing oxygen uptake into liquid stream from oxygen in the atmosphere;

DETAILED DESCRIPTION OF THE INVENTION

Figure 4:
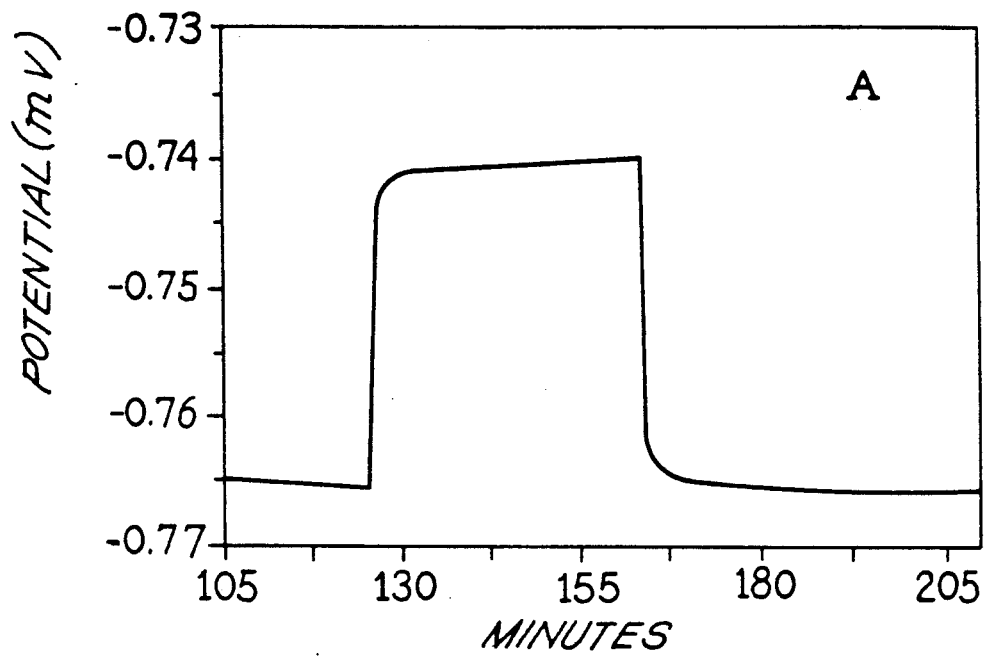
FIG. 4 graphically shows how the debubbler prevents liquid mixing when a bubble is present between the two liquids.

The degasser/debubbler/gasser device of this invention is illustrated in FIG. 1 and 1a. In FIG. 1 a block 1 of rigid plastic material such as acrylic has an open channel 2 in surface 3. In its preferred form, the dimensions of the first block are 1 ¾"×1 ½"×¼". There is an inlet port 4 and an outlet port 5 for delivering liquids to and from the open channel 2. The open channel 2 in block 1 is covered with a hydrophobic, gas-permeable membrane 10 and a venting block 15 with venting holes 16. The second block 15 has approximately the same dimensions as the first block and is constructed of heat conducting material such as ceramic or aluminum. The heating means 20 is operatively connected to the second block 15. The first block 1, the hydrophobic, gas-permeable membrane 10, and the second block 15 are held together by clamping screws or other means for compressing 18 the membrane between the blocks. Venting holes 16 provide for escape of bubbles or dissolved gasses from the channel, through the membrane 10 and into the venting holes. The venting holes 16 can also provide for admitting gasses into the liquid stream via a gas supply means 12.

Membranes useful in practicing this invention are porous, (e.g., gas permeable), hydrophobic membranes. Representative of such membranes are porous teflon, hydrophobic membranes. Both Micro-O ™ (Gelman) and Repel ™ (Fluorotechniques), are porous hydrophobic membranes that can be used with this invention. Micron Separations Inc. (MSI) manufacture a polytetrafluoroethylene (PTFE) laminated membrane that is also suitable for use in this invention.

The debubbler/degasser/gasser of the present invention has a number of advantages. When a sheet of membrane is pressed between two blocks, a thin layer channel, for example, 0.2 mm in depth, can be achieved. The small volume and the thin layer provide greater surface to volume ratio and facilitate rapid degassing and debubbling. In one embodiment, equilibrium gas exchange is achieved for a liquid stream moving at 100 $\mu$l/min for a channel 0.2 mm deep 1.5 mm wide and 120 mm long which provides a residence time in the device of approximately 22 seconds. The membrane can be easily changed. It is also convenient to apply heat to the second block to facilitate degassing. Alternatively, one may apply heat to the liquid stream before it enters the debubbler/degasser/gasser so that bubbles are induced to form prior to the debubbler/degasser/gasser and then are removed by the debubbler/degasser/gasser.

The degasser/debubbler/gasser device of this invention has numerous uses. It can be used to remove bubbles from solutions which are to be analyzed. It is particularly useful in instruments described in U.S. Pat. Nos. 4,591,550; 4,737,464; 4,741,619; 4,704,353 and 4,519,890.

Some instrument components are damaged if air is pumped through them. For example, Teflon valves are damaged by salt crystals that form if salt solution is followed by air. Also, biological cells die very quickly if air is pumped over them and they are not in aqueous medium. If a porous hydrophobic membrane is placed in the fluid stream after the pump and before the sensitive components one can be assured that even if the solution being pumped is depleted, air will not be pumped through the system.

It can be used to degas/gas a liquid, i.e., remove or replace gasses dissolved in the liquid phase, and such degassing is facilitated either by heat, or vacuum. It can be used as a combination debubbler, degasser, and gasser taken in any combination of these three operations.

When two miscible fluids are pumped through tubing, the interface becomes blurred through mixing. One way to keep two fluids from mixing is to put an immiscible fluid or gas bubble between the fluids i.e., separate the first and second liquids by introducing a gas bubble. In many applications, a gas or air is damaging to the measurement system. By placing a porous hydrophobic membrane immediately before the measurement device one can get the benefits of gas or air separation but not the disadvantages associated with gas or air bubbles entering the measurement system.

By placing the device in a chamber in which the gas content is controlled one can effect the gas content of the stream. This would be useful in medium optimization where cell growth is dependent upon the $O_2$ content of the fluid and one would like to monitor or change the $O_2$ level. For applications in which a bicarbonate medium is used, the pH can be controlled by the $CO_2$ level in the gas and therefore the moving stream.

EXAMPLE 1

FIG. 2 describes a heating experiment wherein the oxygen content is measured at different temperatures of the fluid path. The experiment consisted of measuring the oxygen content of a liquid stream after it passed through a debubbler/degasser device consisting of a flow channel sandwiched between a porous hydrophobic membrane and a piece of plastic. The device was both heated and left a room temperature. As seen in FIG. 2, elevating the temperature to 45° C. from 23° C. removed about 25% of the oxygen. (0.64−0.14V)/(0.8−2V−0.14V) =0.74. The oxygen content was measured with an oxygen electrode where increasing voltage corresponds to increasing oxygen level. The signal with no oxygen in the fluid was measured by adding 1.6% sodium bisulfite to the solution to remove oxygen. The oxygen electrode was placed downstream from the debubbler/degasser/gasser so that the temperature of the fluid contacting the oxygen electrode was close to ambient (constant) temperature.

EXAMPLE 2

FIG. 3 describes an experiment wherein the debubbler is used to control the gas content of a liquid stream. The experiment consisted of measuring the oxygen content of a liquid stream after it has passed through a debubbler/degasser/gasser device wherein the gasses on the side of the membrane opposite to the liquid stream are controlled. The device was placed in a bag containing oxygen. Oxygen was allowed to flow through the venting holes 16 of the venting block 15 to contact the hydrophobic membrane 10 (see FIG. 1). The oxygen level of the liquid stream was then compared to the previous oxygen level when the device was in room air. Within two minutes after the device was placed in the oxygen environment, the oxygen level in the stream was noticeably higher. See FIG. 3. This demonstrates that the gas content of a liquid stream can be modified by controlling the atmosphere around the debubbler/degasser/gasser. Returning the device to room air resulted in the return of the oxygen level measured in the stream substantially to the previous level.

EXAMPLE 3

Figure 4A:
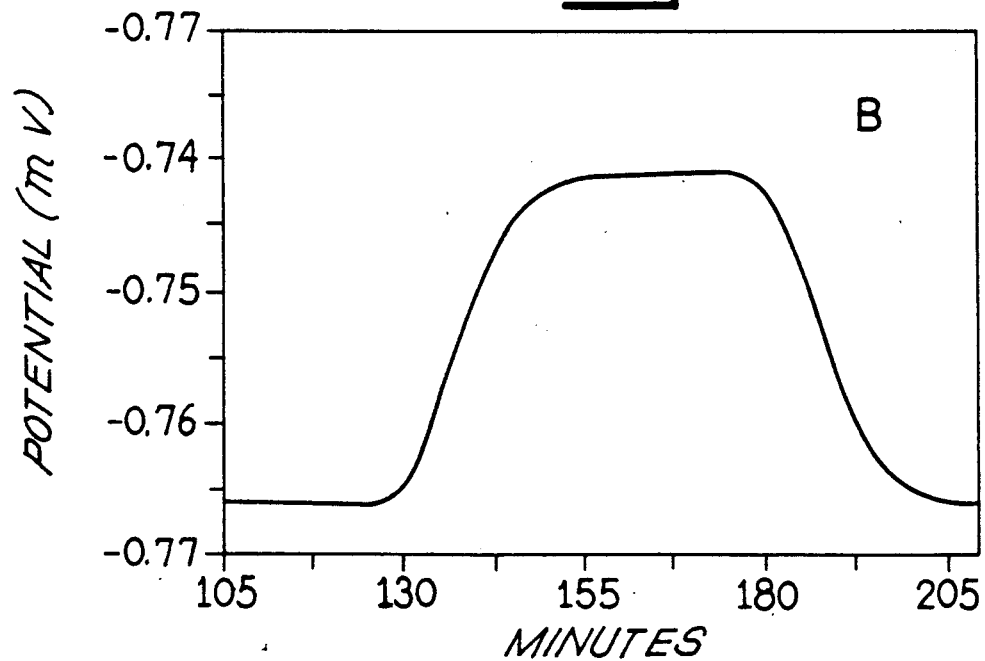
FIG. 4a graphically shows liquid mixing when no bubble is present between the liquids.

FIGS. 4 and 4a describe experiments wherein the debubbler is used to remove a gas bubble employed to prevent liquid mixing. The experimental setup consisted of 78 inches of ⅛ inch id, 3/16 inch od tygon tubing running from a liquid reservoir to a debubbler, which was connected to a microphysiometer flow cell by 3 inches of 0.03 inch id, ¼ inch od tygon tubing. The microphysiometer was of the type described in U.S. Ser. No. 07/408,896 assigned to the same assignee as this application and incorporated herein by reference. The specific microphysiometer has been described in detail by Parce, J. W. et al. *Science,* 246, 243–247, 1989. Two liquids were used, sterile PBS at pH 7.03 and pH 6.55, and a flow rate of 300 $\mu$l per minute. PBS of pH 7.03 was pumped through the setup until the flow cell's pH-sensitive output potential had stabilized, then the liquid inlet tubing was transferred to the pH 6.55 PBS either (A) with a bubble between the two liquids (See FIG. 4) or (B) without a bubble (See FIG. 4a). Bubbles were produced by withdrawing the tubing from the PBS for approximately 30 seconds while the pump ran, drying the end of the tube, then transferring the tube into the second liquid. The setup was run until the output potential measured in the chamber shifted and came to equilibrium at the new pH, then the transfer was repeated in the reverse direction (i.e. from pH 6.55 to pH 7.03). Bubble-less transfers were accomplished by stopping the pump and transferring the tube directly into the second liquid, squeezing the tubing slightly to ensure that a liquid-to-liquid connection was made in the transfer. The amount of liquid in the two reservoirs was fairly ge (approximately 300 ml) compared to the volume of liquid that would be adventitiously introduced during the bubble-less transfers, so the effect of the bubble-less transfer on the pHs of the liquids in the reservoirs would be negligible. Comparing FIG. 4 and FIG. 4A, the effect of the air bubble and its subsequent removal by the debubbler on decreasing mixing of the pH 6.55 and pH 7.03 liquids is clearly observed as a much sharper transition in potential where the air bubble was employed.

The invention has been described in detail with particular reference to an illustrative preferred embodiment thereof, but it will be understood that variations and modifications can be effected within the spirit and scope of the invention as described hereinabove and as defined in the appended claims.

What is claimed is:

1. A device for debubbling, degassing or gassing liquids comprising:
   (a) a first block with a channel on one surface and an inlet and an outlet to the channel;
   (b) a hydrophobic, gas-permeable membrane covering the channel in the first block;
   (c) a second block with a plurality of venting holes, the second block being a heat conducting block;
   (d) a means for compressing the membrane between the first and second blocks; and
   (c) a heating means attached to the first block or the second block whereby the heating means heats the first block to the second block, the first blocks or the second block conducts the heat to the liquid passing through the device, and gas is passed through the hydrophobic, gas-permeable membrane facilitating the gassing, debubbling or degassing of the liquid.

2. A method for debubbling or degassing a liquid utilizing a device having a first block with a channel on one surface and an inlet and outlet to the channel; a hydrophobic, gas-permeable membrane covering the channel in the first block; a second block with venting holes; a heating means connected to the first block or the second block; and a means for compressing the membrane between the first and second block comprising:
   (a) passing the liquid through the hydroponic, gas-permeable membrane covered channel; and
   (b) heating the first block or the second block whereby the liquid passing through the channel is heated and gasses and bubbles in the liquid pass through the hydrophobic, gas-permeable membrane, exiting the device via the venting holes and resulting in a deubbled and degassed liquid.

3. A method for gassing a liquid utilizing a device having a first block with a channel on one surface and an inlet and outlet to the channel; a hydrophobic, gas-permeable membrane covering the channel in the first block; a second block with venting holes; a heating means connected to the first block or the second block; a means for compressing the membrane between the first and second block comprising the steps of:
   (a) passing the liquid stream through the hydroponic, gas-permeable membrane covered channel;
   (b) heating the first block or the second block; and
   (c) supplying gas to the liquid stream via a gas supply means and one or more venting holes whereby the gas to be added flows through one or more of the venting holes, through the hydrophobic, gas-permeable membrane and into the liquid.

* * * * *

UNITED STATES PATENT AND TRADEMARK OFFICE
CERTIFICATE OF CORRECTION

PATENT NO.: 5,053,060

DATED: October 1, 1991

INVENTOR(S): Kopf-Sill and Schwartz

It is certified that error appears in the above-identified patent and that said Letters Patent is hereby corrected as shown below:

At col. 2, line 61, change "12" to -- 22 --.

At col. 3, line 53, change "effect" to -- affect --.

In claim 1, col. 5, line 27, change "(c)" to -- (e) --.

In claim 2, col. 6, line 10 change "hydroponic" to -- hydrophobic --.

In claim 2, col. 6, line 17, change "deubbled" to -- debubbled --.

In claim 3, col. 6, line 26, change "hydroponic" to -- hydrophobic --.

In Fig. 4a, at the top of the Y-axis, change "-0.77" to -- -0.73 --.

Signed and Sealed this

Thirtieth Day of August, 1994

Attest:

BRUCE LEHMAN

Attesting Officer

Commissioner of Patents and Trademarks